(12) United States Patent
Zhang (10) Patent No.: US 7,595,478 B2
(45) Date of Patent: Sep. 29, 2009

(54) METHOD AND DEVICE FOR PROCESSING OPTICAL SIGNALS IN COMPUTER MOUSE

(76) Inventor: Hong-zhi Zhang, 14/F, Block B, Fortune plaza, 7060 Shennan Road, Futian District, Shenzhen, Guangdong 518040 (CN)

( * ) Notice: Subject to any disclaimer, the term of this patent is extended or adjusted under 35 U.S.C. 154(b) by 650 days.

(21) Appl. No.: 10/531,943

(22) PCT Filed: Jan. 16, 2004

(86) PCT No.: PCT/CN2004/000053

§ 371 (c)(1),
(2), (4) Date: Apr. 19, 2005

(87) PCT Pub. No.: WO2004/075040

PCT Pub. Date: Sep. 2, 2004

(65) Prior Publication Data

US 2006/0265530 A1    Nov. 23, 2006

(30) Foreign Application Priority Data

Jan. 20, 2003  (CN) ................................ 03 2 23054
Apr. 18, 2003  (CN) ................................ 03 1 14246

(51) Int. Cl.
*G06F 3/033* (2006.01)
(52) U.S. Cl. ..................... 250/221; 345/166; 250/208.1
(58) Field of Classification Search ................. 250/221, 250/222.1, 208.1; 356/614, 615, 620; 345/163, 345/166
See application file for complete search history.

(56) References Cited

U.S. PATENT DOCUMENTS 4,794,384 A    12/1988    Jackson 4,967,093 A    10/1990    Takemori (Continued)

FOREIGN PATENT DOCUMENTS

GB    2 272 763 A    5/1994

(Continued)

OTHER PUBLICATIONS

Jianxin, Gao et al., "Principle and Applications of Digital Speckle Correlation Method", Nov. 1995, vol. 27, No. 6, pp. 724-731.

(Continued)

*Primary Examiner*—Stephen Yam
(74) *Attorney, Agent, or Firm*—Morris, Manning & Martin LLP; Tim Tingkang Xia (57) ABSTRACT

The present invention discloses a method and a device for processing optical signals in a computer mouse, which is related to electric digital data processing. The method is that the relative displacement vector between the mouse device and the illuminated object surface producing laser speckles is reflected by means of collecting movement information of laser speckle signals. The device for carrying out the method consists of a mouse body; inside said mouse body, an amplifying and shaping module, a direction identifying and counting module and a computer interface circuit for processing photoelectric signals are disposed and connected in sequence, characterized in that, said device further includes at least one laser device and a photo sensor for receiving laser speckle signals from the object surface illuminated by laser beams. Said photo sensor transfers the received photoelectric signals to the amplifying and shaping module. This invention has a simple structure, high technical feasibility and high precision.

3 Claims, 5 Drawing Sheets

U.S. PATENT DOCUMENTS 5,703,356 A * 12/1997 Bidiville et al. ............. 250/221
5,994,710 A * 11/1999 Knee et al. .................. 250/557
6,034,670 A    3/2000 Chen
6,256,016 B1 *  7/2001 Piot et al. .................... 345/166
6,563,129 B1 *  5/2003 Knobel ................. 250/559.04
6,642,506 B1 * 11/2003 Nahum et al. .......... 250/231.13

OTHER PUBLICATIONS

Wen, Zheng G., "Ditgital Phase-Shifting Speckle Pattern Interferometry System", Jul. 2000, vol. 21 No. 3, pp. 167-172.

* cited by examiner

METHOD AND DEVICE FOR PROCESSING OPTICAL SIGNALS IN COMPUTER MOUSE

TECHNICAL FIELD

The present invention relates to electric digital data processing, and more particularly, to a method and a device for processing optical signals in a computer mouse.

BACKGROUND ART

Since computer mouse came into being at the end of 1968, the following four generations, which are divided from a technical view point, have been developed, (1) Mechanical Mouse:

The operation principle of the mechanical mouse lies in the use of the rotary ball at the bottom of the mouse, i.e. when the rotary ball physically contacts the surface of the table and rotates to different directions, it drives the pressure rotary shafts in different directions to rotate. These rotary shafts are connected to a circular coder on which contacts are arranged in a circle. The rotation of the rotary ball is transferred through pressure shafts to enable the contacts to be in contact with contact strips so as to produce on-off signals which are further transformed into 0-1 signals. These data are further transformed into two-dimensional X-Y axes displacement signals by means of a special chip to guide the cursor to move accordingly. Because this type of mouse is of a purely mechanical structure, it has the inherited disadvantages of low precision and vulnerability, and it is now hardly found on the market.

(2) Optical-Mechanical Mouse:

The mechanical mouse is substituted by the optical-mechanical mouse. This type of mouse is of a similar structure of the mechanical mouse. The only difference between them is that a different coder is used to detect the movements of the mouse. The coder used in the optical-mechanical mouse consists of a disc with a plurality of narrow slits, and photo tubes and light-emitting diodes disposed on both sides thereof. The movement of the disc caused by the rotation of the rotary ball sends on-off signals produced by the cutting off of the light path to the photo tubes, and the microprocessor inside the mouse will then calculate the distance and direction of the movement of the mouse based on these signals and the skewing thereof. Since the kernel positioning mechanism of this type of mouse consists of photo components, it is characterized by a longer service life (as compared with the purely-mechanical mouse) and higher positioning precision. However, as the basic positioning mechanism of this type of mouse is still the mechanical rotary ball, just like the conventional mechanical mouse, it will cause the cursor to move slowly or jump resulting in wrong positioning. This is mainly due to the dust attached on the inside rotary shafts. It is necessary to clean it thoroughly before it can be used properly again.

(3) Photo Mouse of the First Generation:

Photo mouse is particularly superior in positioning precision, service life and operation hand-feeling because the positioning system of mechanical structure is not used therein any more.

The photo mouse of the first generation is used with a special mouse pad having a reflecting surface and very regular grid lines formed by black lines and blue lines. Two light-emitting diodes are arranged at the bottom of the mouse, with one emitting red light absorbable by blue lines and the other emitting infrared light absorbable by black lines. At the bottom of the mouse, there is also arranged another group of photo tubes used to receive the reflected lights. The photo mouse determines the direction and distance of the mouse on the basis of the signals reflected after the two groups of lights illuminate the X, Y axes on the mouse pad. As this type of photo mouse has to be operated on a special mouse pad which needs to be always clean, it is not convenient to use the mouse. Therefore, it has not been popularized widely.

(4) Photo Mouse of the Second Generation:

The photo mouse of the second generation is developed by Agilent Technologies Co., Ltd. USA. In said mouse, light-emitting diodes are used to illuminate the surface of an object; snapshots are made at predetermined intervals; and then properties of two pictures are analyzed and processed to detect the moving direction and value of the coordinates.

In order to determine the displacement of the mouse, it is necessary to scan the pictures, therefore scanning frequency becomes an important parameter for assessing the photo mouse. Generally, as a minimum requirement, a scanning frequency of 1,500 times per second is required. The scanning frequency of some of the products made by Microsoft Corporation has reached 6,000 times per second. Another parameter that should not be neglected is the resolution power of the mouse. This parameter is indicated by count per inch (cpi). Generally, the resolution power of the mouse is 400 cpi, i.e. coordinates values are transmitted for 400 times for every movement of 1 inch (while at present, the resolution power of photo mouse of better quality may reach 800 cpi).

As mentioned above, the purely-mechanical mouse has already been eliminated; the optical-mechanical mouse has disadvantages which are difficult to overcome, such as low positioning precision, unsmooth operation hand-feeling and function deterioration after long use; the photo mouse of the first generation has not been popularized widely because of the high requirements for use; nevertheless the photo mouse of the second generation has overcome the disadvantage of inconvenience in use of the photo mouse of the first generation, and is characterized by its high precision and long service life, therefore has occupied a place in the high-end products market. However, due to the complicated principle and structure, its cost remains high, and due to the limitation of the technological and cost factors, its reacting speed is not sufficient.

Contents of the Invention

The object of the present invention is to provide a method and a device for processing optical signals in a computer mouse, so as to solve the problems of inconvenience in use, complexity of technology and high cost of the prior art.

The method for processing optical signals in a computer mouse according to the present invention is: a method for processing optical signals in a computer mouse, characterized in that, the relative displacement vector between the mouse device and the illuminated object surface producing laser speckles is reflected by means of collecting movement information of laser speckle signals.

The relative displacement vector between the mouse device and the illuminated object surface producing laser speckle interferences is reflected by means of collecting movement information of laser speckle interference signals.

Said laser speckle signals or laser speckle interference signals are received by a photo sensor, and said laser speckle signals or laser speckle interference signals are processed, so as to calculate the quantity of laser speckle pulses or laser speckle interferences pulses received by the photo sensor, and to determine the relative displacement between the mouse device and the illuminated object surface producing laser speckles on the basis of the average size of the laser speckles or the laser speckle interferences.

Said photo sensor has groups of photoelectric sensing units, wherein each group consists of two or more photoelectric sensing units aligned in a line. After laser speckle signals or laser speckle interference signals from the object surface illuminated by laser beams are received, relevant photoelectric signals are amplified and shaped by the group of photoelectric sensing units to calculate the size of the component of relative displacement vector between the photo sensor and the illuminated object surface in the direction of the alignment of photoelectric sensing units. In the meantime, the direction of said component of the relative displacement vector is determined by the skewing of the electric signals produced by these two or more photoelectric sensing units.

Said photo sensor has at least two such groups of photoelectric sensing units, wherein each group consists of two or more photoelectric sensing units aligned in a line, and at least one of the groups has an aligning direction different from the others. Two of the groups may intersect with each other and use common units. After laser speckle signals or laser speckle interference signals from the object surface illuminated by laser beams are received, relevant photoelectric signals are amplified and shaped by these groups of photoelectric sensing units, so as to calculate the size and direction of the component of relative displacement vector between the photo sensor and the illuminated object surface of the respective group. And the relative displacement vector between the photo sensor and the illuminated object surface in the two-dimensional plane is calculated on the basis of the size and direction of the component of said relative displacement vector and the intersection angle between the vectors, said size and direction of the component of relative displacement vector and said intersection angle are calculated by two or more groups of photoelectric sensing units in different directions respectively.

The device for processing optical signals in computer mouse for carrying out said method for processing optical signals comprises a mouse body; inside the mouse body, an amplifying and shaping module, a direction identifying and counting module, and a computer interface circuit for processing photoelectric signals are disposed and connected in sequence, characterized in that, said device further includes at least one laser device and a photo sensor for receiving laser speckle signals from the object surface illuminated by laser beams; said photo sensor transfers the received photoelectric signals to the amplifying and shaping module.

It further includes at least two laser devices and a photo sensor for receiving laser speckle interference signals from the object surface illuminated by laser beams; the laser beams emitted from said two or more laser devices illuminate on one or more areas of the surface producing laser speckle interferences, wherein each area is illuminated by at least two beams.

It further includes at least one laser device, a beam splitter and a photo sensor for receiving laser speckle interference signals from the object surface illuminated by laser beams; the laser beam emitted from said laser device is split into two or more beams by the beam splitter to illuminate on one or more areas of the surface producing laser speckle interferences, wherein each area is illuminated by at least two beams.

Figure 1:
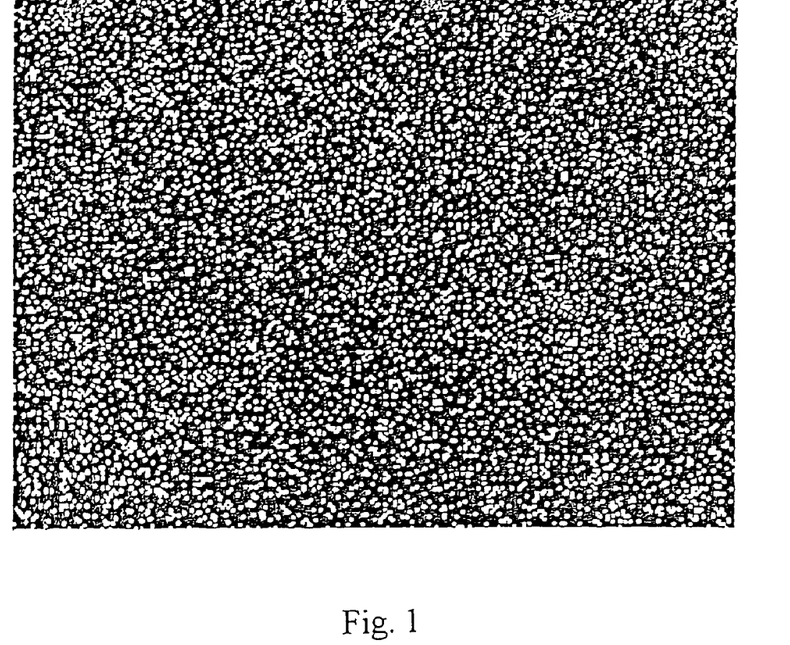
FIG. 1 is a schematic view of laser speckles.

The principle and beneficial effect of the present invention are: when a beam of laser illuminates a rough surface of an object, the illuminated area does not become bright continuously. On the contrary, there are many disorderly alternating bright spots and dark spots. This phenomenon is called speckles. As shown in FIG. 1, the speckles exist not only on the rough surface of an object, but also in the entire space in the vicinity of the rough surface of an object illuminated by laser.

The laser speckle is actually a kind of interference phenomenon caused by the construction and destruction between the scattered light waves on each area unit of the rough surface of an object, which can be explained and the general features of which can be derived with the theory of laser interference.

Theoretical study shows that, if the incidence angle of laser is fixed, the contrast ratio of the speckles is related to the roughness of the surface of the illuminated object. Many objects used in daily life can easily meet the requirements of roughness for forming speckles. Experiments have proved that the phenomenon of speckles can be obviously observed when laser beam illuminates on most ordinary objects, such as table surface, paper, textile, common metal, plastics, pottery and ceramics surfaces, and glass. The laser speckles may be considered dependent on the illuminated surface of the object, therefore they move along with the movement of the object. The relative displacement between the object and the observer (device) can be measured on the basis of this feature of the speckles.

According to the present invention, the relative displacement vector between the laser signal source in the mouse device and the illuminated object surface producing laser speckles is reflected by means of collecting movement information of laser speckle signals. This purely photo technology overcomes all the disadvantages of the mechanical device. It has a simple structure, high technical feasibility, high precision, and may greatly increase the precision and speed of measurement with economic methods.

EMBODIMENTS

Hereinafter, the present invention will be described in details with reference to the accompanying drawings and embodiments.

The method adopted in the present invention is: the relative displacement vector between the laser signal source in the mouse device and the illuminated object surface producing laser speckles is reflected by means of collecting movement information of laser speckle signals, and the laser speckle interference signals are received by photo sensors, and then processed, so as to calculate the quantity of speckle pulses received by the photo sensor, and to determine the relative displacement vector between the laser signal source and the illuminated object surface producing laser speckles according to the average size of the speckles.

Figure 2:
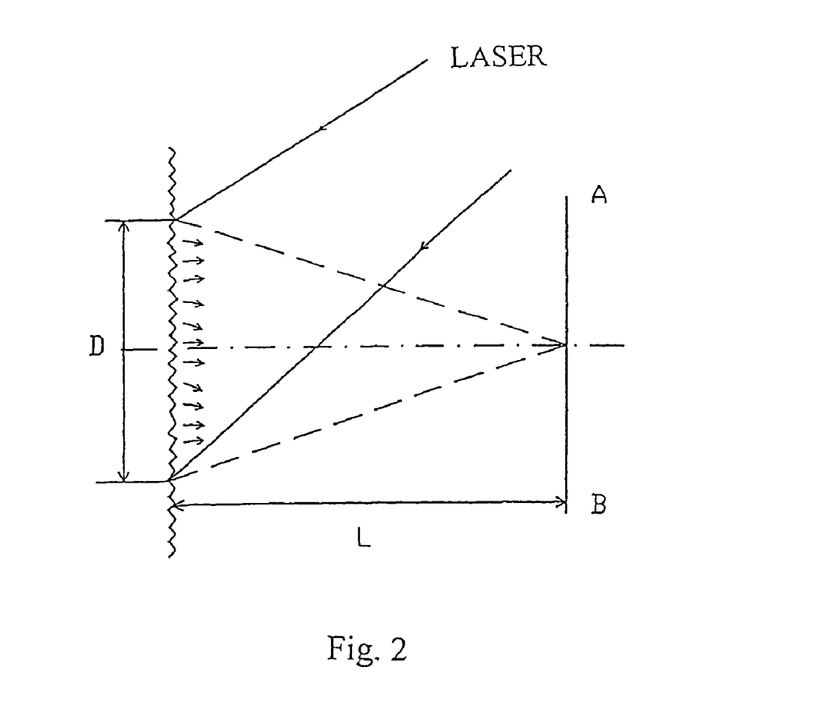
FIG. 2 is a schematic view showing the principle of the present invention.

The size of the laser speckle, i.e., the statistical average value of distances between the adjacent brightest point and darkest point, is related to the wave length of laser and to the aperture angle of the radiation producing the speckles with respect to the plane determining the speckle field. As shown in FIG. 2, the size σ of the speckle formed on the screen AB at a distance of L, which is also called "objective speckle", by laser scatter from the circular area of a diameter D, may be expressed approximately by the following formula 1:

$$\sigma \approx 1.2\lambda L/D$$

Figure 3:
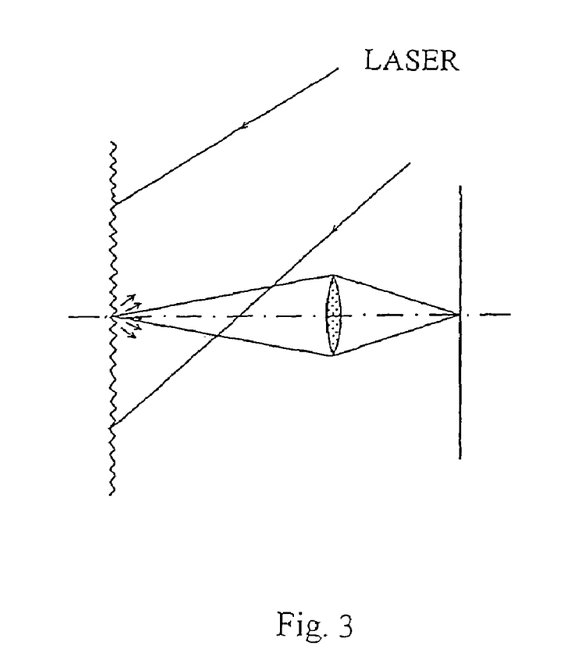
FIG. 3 is a schematic view showing the principle of the present invention.

As shown in FIG. 3, if the radiation field of the scatter is focused onto a screen by a lens, a "subjective speckle" will be formed. Under such circumstances, the relationship between the size σ of the individual speckle and the effective numerical aperture N.A. of the lens may be expressed by the following formula 2:

$$\sigma \approx 0.6\lambda/N.A.$$

Although the size of the speckles follows the statistical rules of the above formula 1 or 2, the size of each specific speckle is random, therefore, accurate measurement data cannot be obtained from simple counting of the pulses outputted and shaped by the photo sensing components. However, since the size of the speckles follows the statistical rules, the sum (or average value) of the size of a plurality of speckles (obtainable by adding a plurality of pulses together or averaging them) can relatively accurately conform with the statistical average size. Moreover, under typical application conditions, speckles are very small, ranging generally from several hundred nanometers to several micrometers, therefore the integrated precision reflected by the sum (or average value) of the size of a plurality of speckles is much higher than the precision (approximately between 30 and 100 micrometers) required by mouse of the prior art. Hence, the sum (or average value) of a plurality of speckle pulses may be used to determine the displacement value of a mouse device.

Figure 4:
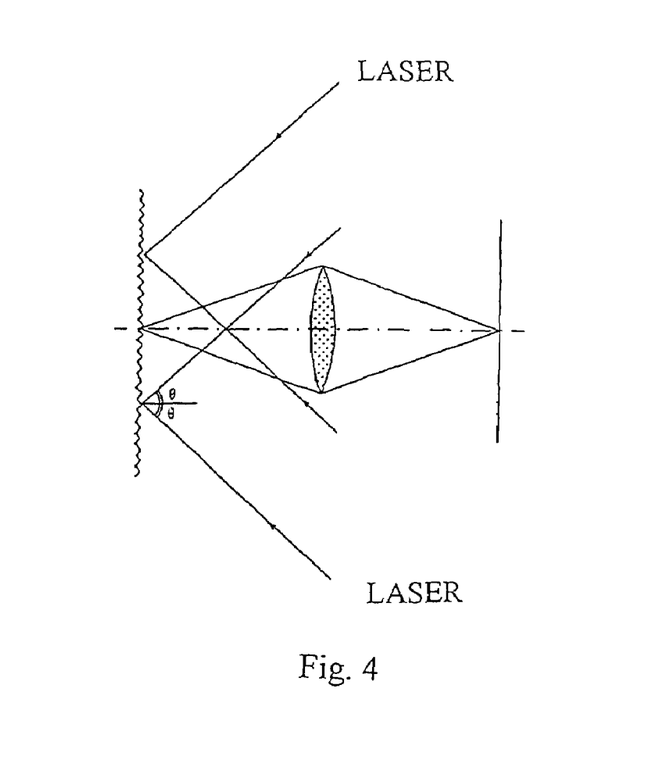
FIG. 4 is a schematic view showing the principle of the present invention.

In the meantime, if two beams of laser are used to illuminate the object at the same angle, more precise measurement results may be obtained at one dimension. As shown in FIG. 4, if the displacement in the direction of the surface of the illuminated object is d, then we have formula 3:

$d = n\lambda/2 \sin \theta$, where n is the quantity of pulses of laser speckles.

If displacement within two-dimensional plane is to be measured according to the principle of formula 3, at least three laser beams are needed and all of the three laser beams shall not be in the same plane.

As mentioned above, various structural forms of single beam, double (multiple) beams may be used in laser speckle measurement for measuring the displacement within a plane. These forms will be discussed respectively hereinafter.

Embodiment 1

Figure 5:
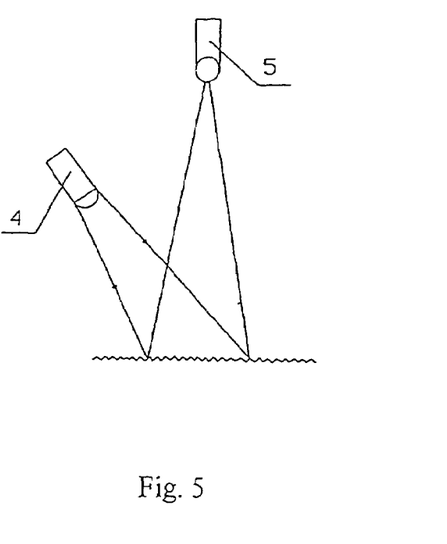
FIG. 5 is a schematic view of the embodiment 1 of the present invention.
Figure 6:
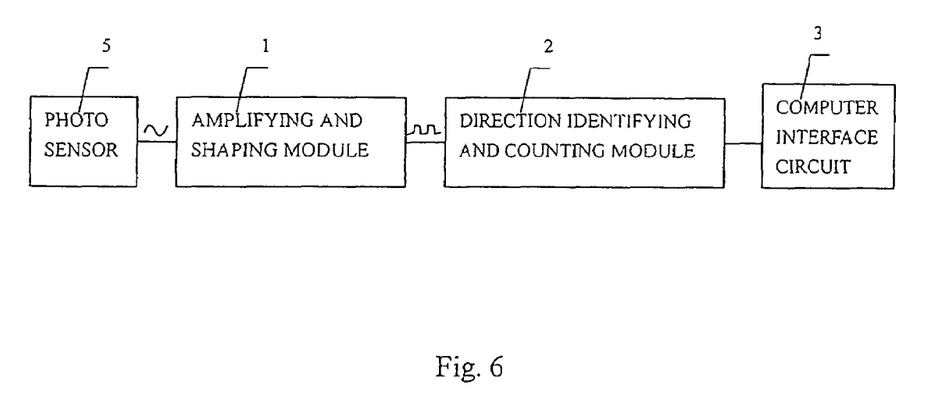
FIG. 6 is a schematic view showing the principle of the circuits of the present invention.

In FIG. 5 and FIG. 6, the device according to the present invention includes a mouse body, and as shown in FIG. 5 and FIG. 6, inside the mouse body, an amplifying and shaping module 1, a direction identifying and counting module 2, and a computer interface circuit 3 are disposed and connected in sequence, and the device further includes a laser device 4 and a photo sensor 5 for receiving laser speckle signals from the object surface illuminated by laser beams. Said photo sensor 5 transfers the received photoelectric signals to the amplifying and shaping module 1.

Said photo sensor 5 has groups of photoelectric sensing units, wherein each group consists of two or more photoelectric sensing units aligned in a line. After laser speckle signals or laser speckle interference signals from the object surface illuminated by laser beams are received, relevant photoelectric signals are amplified and shaped by the group of photoelectric sensing units, so as to calculate the size of the component of relative displacement vector between the photo sensor 5 and the illuminated object surface in the direction of the alignment of photoelectric sensing units. In the meantime, the direction of said component of the relative displacement vector is determined by the skewing of the electric signals produced by these two or more photoelectric sensing units. The photo sensor has at least two groups of photoelectric sensing units, wherein each group consists of two or more photoelectric sensing units aligned in a line, and at least one group has an aligning direction different from the others. Two of the groups may intersect with each other and use common units. And the relative displacement vector between the photo sensor 5 and the illuminated object surface in the two-dimensional plane is calculated on the basis of the size and direction of the component of the relative displacement vector and the intersection angle between these vectors, which are calculated by the group of photoelectric sensing units respectively.

As shown in FIG. 6, after laser speckle signals from the object surface illuminated by laser beams are received by the photo sensor 5, relevant photoelectric signals are transferred to the amplifying and shaping module 1 for processing, and then they are processed by the direction identifying and counting module 2 to determine the moving direction of the speckles in the entire two-dimensional plane, so as to obtain the moving direction of the mouse device. The signals processed by the direction identifying and counting module 2 are transferred to the computer interface circuit 3, which may use the interface and processing circuit module of the ordinary mouse, for sending out control signals to the computer.

Embodiment 2

Figure 7:
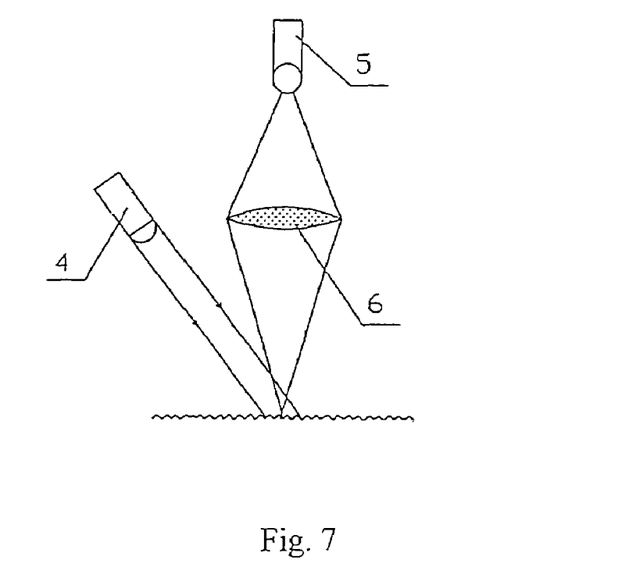
FIG. 7 is a schematic view of the embodiment 2 of the present invention.

As shown in FIG. 7 and with reference to FIG. 6, the difference between the present embodiment and embodiment 1 is that, in the present embodiment, a focusing lens 6 is arranged in the light path for receiving laser speckle signals in the photo sensor 5. As the structure, principle and operation method are the same as those of the embodiment 1, unnecessary details will not be given here.

Embodiment 3

Figure 8:
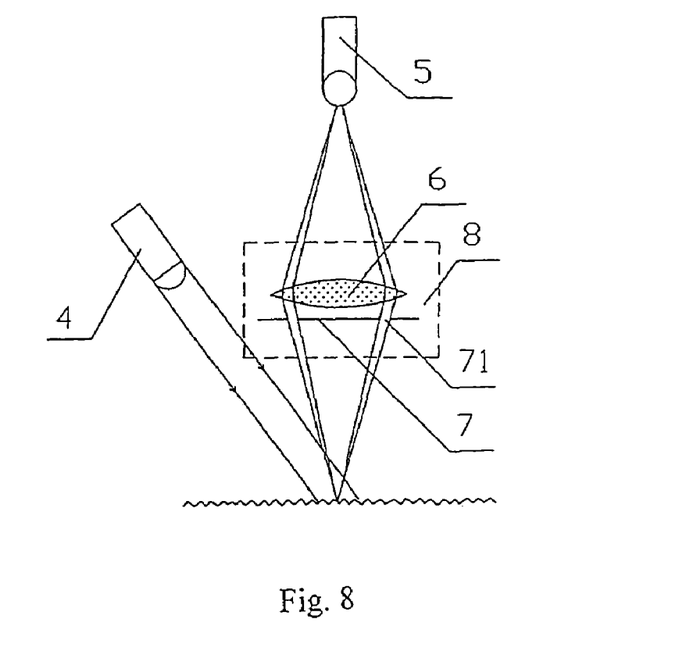
FIG. 8 is a schematic view of the embodiment 3 of the present invention.

As shown in FIG. 8 and with reference to FIG. 6, the difference between the present embodiment and embodiment 1 is that, in the present embodiment, a beam splitter 8 is arranged in the light path, and the laser beam emitted by the laser device is split into two or more beams by the beam splitter 8 to illuminate onto one or more areas of the surface producing laser speckle interferences, wherein each area illuminated by at least two beams.

Here, the beam splitter 8 consists of a focusing lens 6 and a pupil 7, wherein said pupil 7 has at least three light apertures 71 arranged in front of or behind the focusing lens 6. The centers of the light apertures 71 are not in a line. Since the centers of the light apertures 71 are not in a line, two-dimensional sampling of photoelectric signals of displacement may be conducted. FIG. 8 shows only two light apertures in one dimension, and the light aperture in the other dimension which is not shown is similar in structure. In the present embodiment, a structural form of double (multiple) beams is used, whereas both in embodiment 1 and embodiment 2, the structural form of single beam is used. The structural form of double (multiple) beams helps to enhance the coherence of the light source, improve the reliability and precision of detection. As the structure of other parts and the principle and operation method of the present embodiment are the same as those of embodiment 1 and embodiment 2, unnecessary details will not be given here.

Embodiment 4

Figure 9:
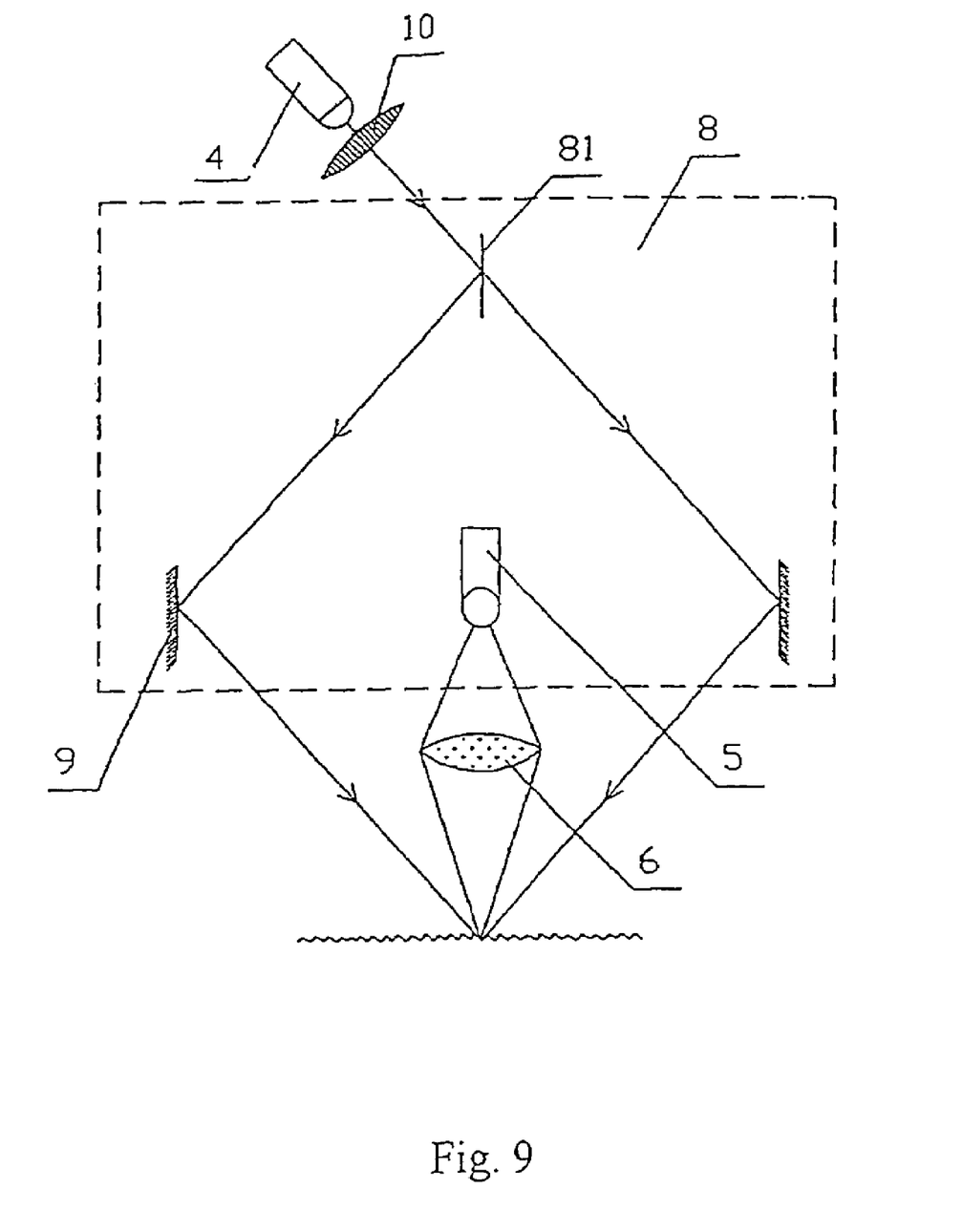
FIG. 9 is a schematic view of the embodiment 4 of the present invention.

As shown in FIG. 9 and with reference to FIG. 6, in the present embodiment, a beam splitter 8 consisting of a spectroscope 81 and a speculum 9 is used. Laser device 4 forms two laser beams through a spectroscope 81. The split laser beams converge on the object surface after being reflected by the speculum 9. FIG. 9 shows the spectroscope 81 and speculum 9 in the light path in one-dimensional direction. One or two of the above-mentioned two laser beams may further be split by the spectroscope 81 into three or four laser beams to illuminate the object surface. Thus, two-dimensional sampling of photoelectric signals of displacement is realized by splitting the laser beam by the spectroscope 81 into multiple laser beams to illuminate the object surface. In the present embodiment, the structural form of double (multiple) beams is also used. As the structure of other parts and the principle and operation method of the present embodiment are the same as those of the above-mentioned embodiments, unnecessary details will not be given here.

In each of the embodiments, a collimation lens 10 may also be arranged in the emission path of the laser device 4. As shown in FIG. 9, the main object of arranging a collimation lens 10 is to reduce the illuminated area of the object surface so as to facilitate measuring. A diaphragm having light apertures may also be arranged in the emission path of the laser device 4. The main function, method of usage of the diaphragm is similar to those of the collimation lens 10, therefore unnecessary details will not be given here.

In embodiment 3 and embodiment 4, a beam splitter 8 is used. The laser beam emitted by the laser device is split into two or more beams by the beam splitter 8 to illuminate one or more areas of the surface producing laser speckle interferences. The relative displacement vector between the mouse device and the illuminated object surface producing laser speckle interferences is reflected by means of collecting movement information of laser speckle interference signals.

In the present invention, as long as coherence is ensured, two or more laser devices 4 may be used. The laser beams emitted by the two or more laser devices 4 illuminate one or more areas of the surface producing laser speckle interferences, wherein each area is illuminated by at least two beams. The relative displacement vector between the mouse device and the illuminated object surface producing laser speckle interferences is reflected by means of collecting movement information of laser speckle interference signals. As the principle and method of usage are the same as the above, unnecessary details will not be given here.

What is claimed is:

1. A method for processing optical signals in a computer mouse, characterized in that, a laser beam is provided to illuminate the surface of an object, laser speckles are produced in the vicinity of the illuminated object surface; when the mouse is moving, the signals of the laser speckles are received by a photo sensor installed in the mouse, and the signals are processed, so as to calculate the quantity of laser speckle pulses received by the photo sensor, and to determine the relative displacement between the photo sensor and the illuminated object surface producing laser speckles on the basis of the average size of the laser speckles, wherein none of the laser speckles is stored, and wherein no cross-correlation analysis is performed in the determination of the relative displacement.

2. The method for processing optical signals in a computer mouse as claimed in claim 1, characterized in that, said photo sensor has groups of photoelectric sensing units, wherein each group comprises two or more photoelectric sensing units aligned in a line; after laser speckle signals on the object surface illuminated by laser beams are received by said groups of photoelectric sensing units, relevant photoelectric signals are amplified and shaped to calculate the size of the component of the relative displacement vector between the photo sensor and the illuminated object surface lying in the direction of the alignment of photoelectric sensing units; in the meantime, the direction of said component of the relative displacement vector is determined by the skewing of the electric signals produced by these two or more photoelectric sensing units.

3. The method for processing optical signals in a computer mouse as claimed in claim 1, characterized in that, said photo sensor has at least two groups of photoelectric sensing units, wherein each group comprises two or more photoelectric sensing units aligned in a line, and at least one group has an aligning direction different from the others, two of the at least two groups are intersectable with each other and use common units; after laser speckle signals on the object surface illuminated by laser beams are received, relevant photoelectric signals are amplified and shaped by these groups of photoelectric sensing units to calculate the size and direction of the component of relative displacement vector between the photo sensor and the illuminated object surface of the respective group, and the relative displacement vector between the photo sensor and the illuminated object surface in the two-dimensional plane is calculated on the basis of the size and direction of the components of said relative displacement vector calculated by two or more groups in different directions and the intersection angle between the components in different directions.

* * * * *